(12) United States Patent
Nguyen et al.

(10) Patent No.: US 10,593,981 B2
(45) Date of Patent: Mar. 17, 2020

(54) HETEROGENEOUS CERAMIC COMPOSITE SOFC ELECTROLYTE

(71) Applicant: BLOOM ENERGY CORPORATION, Sunnyvale, CA (US)

(72) Inventors: Dien Nguyen, San Jose, CA (US); Ravi Oswal, Fremont, CA (US); Tad Armstrong, Burlingame, CA (US); Emad El Batawi, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 15/415,953

(22) Filed: Jan. 26, 2017

(65) Prior Publication Data
US 2017/0200964 A1 Jul. 13, 2017

Related U.S. Application Data

(62) Division of application No. 12/081,124, filed on Apr. 10, 2008.
(Continued)

(51) Int. Cl.
*H01M 8/1253* (2016.01)
*C04B 35/48* (2006.01)
(Continued)

(52) U.S. Cl.
CPC ........... *H01M 8/1253* (2013.01); *C04B 35/48* (2013.01); *C04B 35/64* (2013.01); *H01M 4/8621* (2013.01);
(Continued)

(58) Field of Classification Search
CPC .. H01M 8/1253; H01M 8/126; H01M 4/9033; H01M 4/9066; H01M 4/8657;
(Continued)

(56) References Cited

U.S. PATENT DOCUMENTS 4,052,532 A 10/1977 Tannenberger
4,272,353 A 6/1981 Lawrance et al.
(Continued)

FOREIGN PATENT DOCUMENTS

CN 101147285 A 3/2008
CN 101295792 A 10/2008
(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-16.
(Continued)

*Primary Examiner* — Ula C Ruddock
*Assistant Examiner* — Matthew W Van Oudenaren
(74) *Attorney, Agent, or Firm* — The Marbury Law Group, PLLC

(57) ABSTRACT

A solid oxide fuel cell (SOFC) includes a cathode electrode, a solid oxide electrolyte, and an anode electrode. The electrolyte includes yttria stabilized zirconia and scandia stabilized zirconia, such as scandia ceria stabilized zirconia.

7 Claims, 3 Drawing Sheets

Related U.S. Application Data

(60) Provisional application No. 60/907,706, filed on Apr. 13, 2007.

(51) Int. Cl.
  *C04B 35/64* (2006.01)
  *H01M 4/86* (2006.01)
  *H01M 4/90* (2006.01)
  *H01M 8/126* (2016.01)
  *H01M 8/124* (2016.01)

(52) U.S. Cl.
  CPC ....... *H01M 4/8657* (2013.01); *H01M 4/9033* (2013.01); *H01M 4/9066* (2013.01); *H01M 8/126* (2013.01); *C04B 2235/3224* (2013.01); *C04B 2235/3225* (2013.01); *C04B 2235/3246* (2013.01); *C04B 2235/602* (2013.01); *C04B 2235/96* (2013.01); *H01M 2008/1293* (2013.01); *H01M 2300/0077* (2013.01); *H01M 2300/0091* (2013.01); *Y02E 60/525* (2013.01); *Y02P 70/56* (2015.11)

(58) Field of Classification Search
  CPC ....... H01M 2008/1293; H01M 4/8647; H01M 4/8652; H01M 2004/8684; H01M 4/9025; C04B 35/64; C04B 35/48; C04B 2235/602; C04B 2235/3246; C04B 2235/3225; C04B 2235/3224; C04B 2235/96
  See application file for complete search history.

(56) References Cited

U.S. PATENT DOCUMENTS

| | | |
|---|---|---|
| 4,426,269 A | 1/1984 | Brown et al. |
| 4,459,340 A | 7/1984 | Mason |
| 4,575,407 A | 3/1986 | Diller |
| 4,686,158 A | 8/1987 | Nishi et al. |
| 4,792,502 A | 12/1988 | Trocciola et al. |
| 4,804,592 A | 2/1989 | Vanderborgh et al. |
| 4,847,173 A | 7/1989 | Mitsunnaga et al. |
| 4,898,792 A | 2/1990 | Singh et al. |
| 4,913,982 A | 4/1990 | Kotchick et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Ryoichi |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett |
| 5,741,605 A | 4/1998 | Gillett et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,106,964 A | 8/2000 | Voss et al. |
| 6,228,521 B1 * | 5/2001 | Kim .............. H01M 4/8657 429/496 |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B1 | 8/2002 | DuBose et al. |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B2 | 7/2003 | Gordon |
| 6,605,316 B1 | 8/2003 | Visco |
| 6,623,880 B1 | 9/2003 | Geisbrecht et al. |
| 6,677,070 B2 | 1/2004 | Kearl |
| 6,682,842 B1 | 1/2004 | Visco et al. |
| 6,767,662 B2 | 7/2004 | Jacobson |
| 6,787,261 B2 | 9/2004 | Ukai et al. |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 * | 12/2005 | Beatty ............. H01M 8/1097 429/456 |
| 6,979,511 B2 | 12/2005 | Visco |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,550,217 B2 | 6/2009 | Kwon |
| 7,563,503 B2 | 7/2009 | Gell |
| 7,601,183 B2 | 10/2009 | Larsen |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0048701 A1 * | 4/2002 | Ukai .............. C04B 35/486 429/482 |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0162067 A1 | 8/2003 | McElroy |
| 2003/0165732 A1 | 9/2003 | McElroy |
| 2003/0196893 A1 | 10/2003 | McElroy |
| 2004/0072054 A1 * | 4/2004 | Cochran ............. B21C 23/14 429/508 |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0202924 A1 * | 10/2004 | Tao ................ H01M 4/9041 429/102 |
| 2004/0224193 A1 | 11/2004 | Mitlitsky et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |

(56) References Cited

U.S. PATENT DOCUMENTS

| | | | |
|---|---|---|---|
| 2006/0166070 A1* | 7/2006 | Hickey | C04B 35/01 429/486 |
| 2006/0216575 A1 | 9/2006 | Cassidy | |
| 2006/0222929 A1 | 10/2006 | Hickey et al. | |
| 2007/0045125 A1 | 3/2007 | Hartvigsen et al. | |
| 2007/0082254 A1 | 4/2007 | Hiwatashi | |
| 2007/0287048 A1 | 5/2007 | Couse | |
| 2007/0141423 A1 | 6/2007 | Suzuki | |
| 2007/0141443 A1 | 6/2007 | Brown | |
| 2007/0141444 A1 | 6/2007 | Brown | |
| 2007/0224481 A1 | 9/2007 | Suzuki et al. | |
| 2007/0237999 A1 | 10/2007 | Donahue | |
| 2007/0275292 A1 | 11/2007 | Sin Xicola et al. | |
| 2008/0029388 A1 | 2/2008 | Elangovan | |
| 2008/0075984 A1 | 3/2008 | Badding | |
| 2008/0076006 A1 | 3/2008 | Gottmann et al. | |
| 2008/0096080 A1 | 4/2008 | Batawi | |
| 2008/0102337 A1 | 5/2008 | Hiroyuki | |
| 2008/0254336 A1 | 10/2008 | Batawi | |
| 2008/0261099 A1 | 10/2008 | Nguyen | |
| 2009/0029195 A1 | 1/2009 | Gauckler | |
| 2009/0068533 A1 | 3/2009 | Takayuki | |
| 2009/0186250 A1 | 7/2009 | Yeshwanth | |
| 2009/0214919 A1 | 8/2009 | Suzuki | |
| 2009/0291347 A1 | 11/2009 | Suzuki | |
| 2011/0039183 A1 | 2/2011 | Armstrong et al. | |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-340240 | 8/2000 |
| JP | 2000-281438 | 10/2000 |
| JP | 2008-305804 | 12/2008 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO2004/093214 | 10/2004 |
| WO | WO2005/041329 | 5/2005 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.
L.G. Austin, "Cell & Stack Construction: Low Temperature Cells," NASA SP-120, 1967.
EG & G Services, Parsons, Inc., SAIC, Fuel Cell Handbook, 5th Edition, USDOE, Oct. 2000, p. 9-1-9.4, and 9-12-9.14.
J.M. Sedlak, et al., "Hydrogen Recovery and Purification Using the Solid Polymer Electrolyte Electrolysis Cell," Int. J. Hydrogen Energy, vol. 6, p. 45-51, 1981.
Dr. Ruhl, "Low Cost Reversible Fuel Cell System," Proceedings of the 2000 U.S. DOE Hydrogen Program Review, Jun. 15, 2000, NREL/CP-570-30535.
Low Cost, Compact Solid Oxide Fuel Cell Generator, NASA Small Business Innovation Research Program.
Low Cost, High Efficiency Reversible Fuel Cell (and Electrolyzer) Systems, Proceedings of the 2001 DOE Hydrogen Program Review NREL/CP-570-30535.
Milliken et al., "Low Cost, High Efficiency Reversible Fuel Cell Systems," Proceedings of the 2002 U.S. DOE Hydrogen Program Review, NREL/CP-610-32405.
K. Eguchi et al., Power Generation and Steam Electrolysis Characteristics of an Electrochemical Cell with a Zirconia or Ceria based Electrode, Solid State Ionics, 86 88, 1996, p. 1245-49.
F. Mitlitsky et al., "Regenerative Fuel Cells for High Altitude Long Endurance Solar Powered Aircraft," 28$^{th}$ Intersociety Energy Conversion Engineering Conference (IECED), Jul. 28, 1993, UCRL-JC-113485.
Small, Ultra Efficient Fuel Cell Systems, Advanced Technology Program, ATP 2001 Competition, Jun. 2002.
F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.
Ralph et al., "Cathode Materials for Reduced-Temperature SOFCs," Journal of the Electrochemical Society, 2003, p. A1518-A1522, vol. 150.
Simmer et al., "Development of Fabrication Techniques and Electrodes for Solid Oxide Fuel Cells," Electrochemcial Society Proceedings, p. 1050-1061, vol. 2001-16.
Yamamoto et al., "Electrical Conductivity of Stabilized Zirconia with Ytterbia and Scandia," Solid State Ionics, v79, p. 137-142, Jul. 1995.
Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.
Lybye et al., "Effect of Transition Metal Ions on the Conductivity and Stability of Stabilized Zirconia," Ceramic Engineering and Science Proceedings, v27, n4, p. 67-78, 2006.
Aman et al., Abstract, "Numerical Simulation of Electrolyte-Supported Planar Button Solid Oxide Fuel Cell," Excerpts from the Proceedings of the 2012 COMSOL Conference, Boston, MA. 3 pages.
Shao et al., "Anode-Supported Thin-Film Fuel Cells Operated in a Single Chamber Configuration 2T-1-12," Solid State Ionics 175 (2004), pp. 39-46.
Hanifi et al., "Fabrication of Thin Porous Electrolyte-Supported Tubular Fuel Cells Using Slip Casting," Journal of Ceramic Processing Research, vol. 12, No. 3, pp. 336-342 (2011 ).
Verbraeken, M., "Advanced Supporting Anodes for Solid Oxide Fuel Cells," 2005, Master of Science Thesis, University of Twente, Enschede, Netherlands. 74 pages.
Gentile, P.S., "Development of a Novel High Performance Electrolyte Supported Solid Oxide Fuel Cell," Nov. 2007, Master of Science Thesis, Montana State University, Bozeman, MT. 181 pages.

\* cited by examiner

HETEROGENEOUS CERAMIC COMPOSITE SOFC ELECTROLYTE

CROSS-REFERENCE TO RELATED PATENT APPLICATIONS

The present application is a Divisional of U.S. patent application Ser. No. 12/081,124, filed Apr. 10, 2008, which claims benefit of U.S. Provisional Application No. 60/907,706, filed Apr. 13, 2007, the entire contents of which are incorporated herein by reference.

BACKGROUND

The present invention is generally directed to fuel cell components, and to solid oxide fuel cell electrolyte materials in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

SUMMARY

A solid oxide fuel cell (SOFC) includes a cathode electrode, a solid oxide electrolyte, and an anode electrode. The electrolyte includes yttria stabilized zirconia and a scandia stabilized zirconia, such as a scandia ceria stabilized zirconia.

DETAILED DESCRIPTION OF THE EMBODIMENTS

The embodiments of the invention provide a higher strength electrolyte material to enable a thinner electrolyte and/or larger footprint electrolyte, while lowering the cost for electrolyte production. The composite electrolyte material comprises a composite yttria and scandia stabilized zirconias. The mixture of yttria and scandia stabilized zirconia exhibits a good flexural strength increase, and reasonable conductivity decrease compared to scandia stabilized zirconia. The electrolyte composition provides a coefficient of thermal expansion (CTE) which is closely matched to that of a chromium-iron alloy interconnect component of a SOFC stack. SOFC cells comprising the composite electrolyte can operate for a long time with a low degradation rate. By mixing a lower cost yttria stabilized zirconia powder with a higher cost, higher performance scandia stabilized zirconia powder, the overall cost of the electrolyte is reduced without significantly impacting the electrolyte performance compared to a scandia stabilized zirconia electrolyte.

Figure 1:
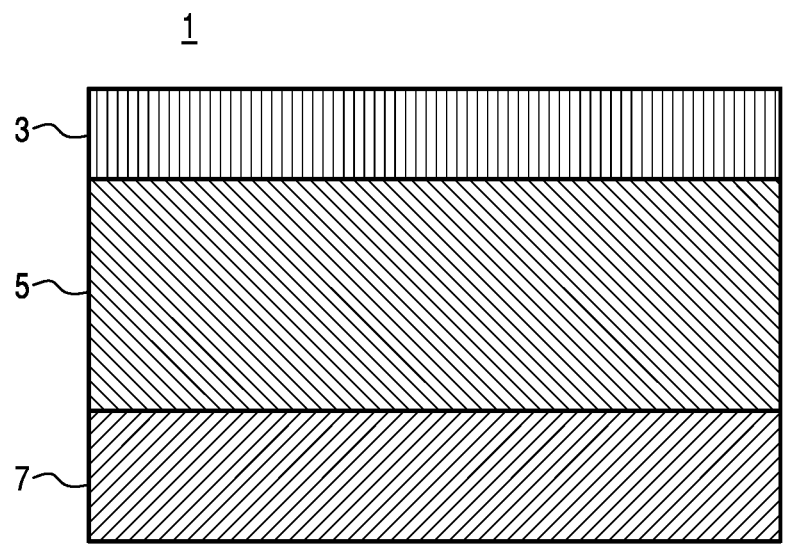
FIG. 1 illustrates a side cross-sectional view of a SOFC of the embodiments of the invention.

FIG. 1 illustrates a solid oxide fuel cell (SOFC) 1 according to an embodiment of the invention. The cell 1 includes an anode electrode 3, a solid oxide electrolyte 5 and a cathode electrode 7. The electrolyte 5 may comprise a sintered mixture of scandia stabilized zirconia ("SSZ") (including scandia ceria stabilized zirconia ("SCSZ"), which can also be referred to as scandium and cerium doped zirconia), and yttria stabilized zirconia ("YSZ"). The electrolyte may also contain unavoidable impurities. For example, the electrolyte 5 may comprise a mixture of YSZ and one of SSZ with no ceria or SCSZ, such as a YSZ/SCSZ mixture in an about 1:1 to about 1:4 weight ratio, such as an about 1:2 to 1:3 weight ratio. Thus, YSZ may comprise up to 50% by weight of the electrolyte 5. In alternative embodiments, the SCSZ may be substituted by SSZ.

Preferably, 3 molar percent yttria YSZ is used. However, YSZ compositions having more than 3 molar percent yttria, such as 3 to 10 molar percent yttria, for example 5 to 10 molar percent yttria (i.e., $(ZrO_2)_{1-z}(Y_2O_3)_z$, where $0.03 \leq z \leq 0.1$) may be used.

Preferably, the scandia stabilized zirconia has the following formula: $[(ZrO_2)_{1-y}(CeO_2)_y]_{1-x}(Sc_2O_3)_x$, where $0.06 \leq x \leq 0.11$ and $0 \leq y \leq 0.01$. While a stoichiometric stabilized zirconia is described by the formula, a non-stoichiometric stabilized zirconia having more or less than two oxygen atoms for each metal atom may be used. For example, the electrolyte may comprise SCSZ having 1 molar percent ceria and 10 molar percent scandia (i.e., $[(ZrO_2)_{1-y}(CeO_2)_y]_{1-x}(Sc_2O_3)_x$ where x=0.1 and y=0.01). The ceria in SCSZ may be substituted with other ceramic oxides. Thus, alternative scandia stabilized zirconias can be used, such as scandia yttria stabilized zirconia ("SYSZ"), which can also be referred to as scandium and yttrium doped zirconia, and scandia alumina stabilized zirconia ("SAlSZ"), which can also be referred to as scandium and aluminum doped zirconia. The yttria or alumina may comprise 1 molar percent or less in the scandia stabilized zirconia.

The cathode electrode 7 may comprise an electrically conductive material, such as an electrically conductive perovskite material, such as lanthanum strontium manganite (LSM). Other conductive perovskites, such as $La_{1-x}Sr_xCoO_3$, $La_{1-x}Sr_xFe_{1-y}Co_yO_3$ or $La_{1-x}Sr_xMn_{1-y}Co_yO_3$ where 0.1≤x≤0.4 and 0.02≤y≤0.4, respectively, may also be used. The cathode electrode 7 can also be composed of two sublayers (a SCSZ/LSM functional layer adjacent to the electrolyte and a LSM current collection layer over the functional layer).

The anode electrode 3 may comprise one or more sublayers. For example, the anode electrode may comprise a single layer Ni-YSZ and/or a Ni-SSZ cermet. In a preferred embodiment, the anode electrode comprises two sublayers, where the first sublayer closest to the electrolyte is composed of samaria doped ceria ("SDC") and the second sublayer distal from the electrolyte comprises nickel, gadolinia doped ceria ("GDC") and a scandia stabilized zirconia ("SSZ"), such as a scandia ceria stabilized zirconia ("SCSZ").

The samaria doped ceria preferably comprises 15 to 25 molar percent, such as for example 20 molar percent samaria and a balance comprising ceria. The SDC may have the following formula: $Sm_zCe_{1-z}O_{2-\delta}$, where 0.15≤z≤0.25. While a non-stoichiometric SDC is described by the formula where there is slightly less than two oxygen atoms for each metal atom, an SDC having two or more oxygen atoms for each metal atom may also be used. Preferably, the first sublayer contains no other materials, such as nickel, besides the SDC and unavoidable impurities. However, if desired, other materials may be added to the first sublayer, such as a small amount of nickel in an amount less than the amount of nickel in the second sublayer.

The second sublayer comprises a cermet including a nickel containing phase and a ceramic phase. The nickel containing phase of the second sublayer preferably consists entirely of nickel in a reduced state. This phase forms nickel oxide when it is in an oxidized state. Thus, when the anode is fabricated, the nickel containing phase comprises nickel oxide. The anode electrode is preferably annealed in a reducing atmosphere prior to operation to reduce the nickel oxide to nickel. The nickel containing phase may include other metals and/or nickel alloys in addition to pure nickel, such as nickel-copper or nickel-cobalt alloys (in a reduced state) and their oxides (in an oxidized state), for example $Ni_{1-x}Cu_xO$ or $Ni_{1-x}Co_xO$ where 0.05≤x≤0.3. However, the nickel containing phase preferably contains only nickel or nickel oxide and no other metals. The nickel is preferably finely distributed in the ceramic phase, with an average grain size less than 500 nanometers, such as 200 to 400 nanometers, to reduce the stresses induced when nickel converts to nickel oxide.

The ceramic phase of the second sublayer preferably comprises gadolinia doped ceria and scandia stabilized zirconia. The ceramic phase may comprise a sintered mixture of GDC and SSZ (containing some or no cerium) ceramic particles. The scandia stabilized zirconia may have the same composition as the scandia stabilized zirconia of the electrolyte 5. Preferably, the scandia stabilized zirconia of sublayer 23 has the following formula: $[(ZrO_2)_{1-y}(CeO_2)_y]_{1-x}(Sc_2O_3)_x$, where 0.06≤x≤0.11 and 0≤y≤0.01. While a stoichiometric stabilized zirconia is described by the formula, a non-stoichiometric stabilized zirconia having more or less than two oxygen atoms for each metal atom may be used. For example, the electrolyte may comprise SCSZ having up to 1 molar percent ceria, about 6 to about 11 molar percent scandia and a balance comprising zirconia, such as SCSZ having 1 molar percent ceria and 10 molar percent scandia (i.e., $Sc_xCe_yZr_{1-x-y}O_2$ where x=0.1 and y=0.01).

Any suitable GDC may be used in the second sublayer. For example, 10 to 40 molar percent gadolinia containing GDC may be used. GDC is preferably slightly non-stoichiometric with less than two oxygen atoms for each metal atom: $Ce_{1-m}Gd_mO_{2-\delta}$ where 0.1≤m≤0.4. However, GDC containing two or more oxygen atoms for each metal atom may also be used. The weight ratio of GDC to SSZ or SCSZ in the sublayer ranges from about 2:1 to about 5:1. For example, the weight ratio may be 5:1. If the ceramic phase contains no other components besides GDC and the stabilized zirconia, then the ceramic phase in the second sublayer may range from about 70 (such as for example 66.66) weight percent GDC and about 30 (such as for example 33.33) weight percent stabilized zirconia to about 85 (such as for example 83.33) weight percent GDC and about 15 (such as for example 16.66) weight percent stabilized zirconia. The ceramic phase preferably contains no other ceramic materials besides GDC, one of SSZ or SCSZ and unavoidable impurities.

The second sublayer preferably comprises 60 to 80 weight percent of the nickel containing phase and 40 to 20 weight percent of the ceramic phase, such as for example 75 weight percent of the nickel containing phase and 25 weight percent of the ceramic phase.

Any suitable layer thicknesses may be used. For example, the anode electrode 3 may be 20 to 40 microns thick, where the first sublayer is about 5 to about 10 microns thick and the second sublayer is about 15 to about 30 microns thick. The fuel cell is preferably a planar electrolyte supported cell in which the electrolyte is at least one order of magnitude thicker than the anode electrode. For example, the electrolyte 5 may be about 150 to about 300 microns thick. The cathode 7 may also be between 10 and 50 microns thick.

Figure 2:
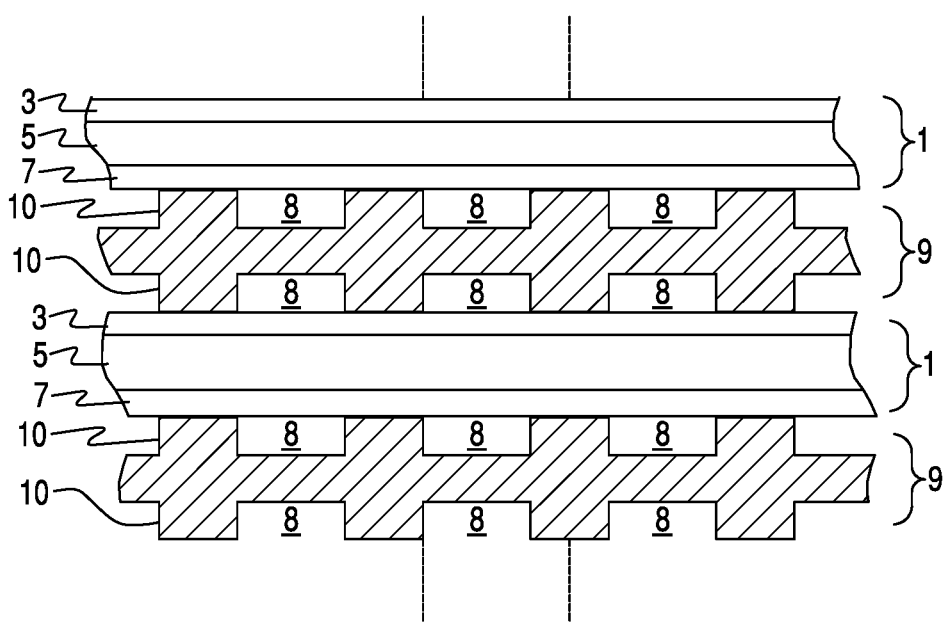
FIG. 2 illustrates a side cross sectional view of a SOFC stack of an embodiment of the invention.

Fuel cell stacks are frequently built from a multiplicity of SOFC's 1 in the form of planar elements, tubes, or other geometries. Fuel and air has to be provided to the electrochemically active surface, which can be large. As shown in FIG. 2, one component of a fuel cell stack is the so called gas flow separator (referred to as a gas flow separator plate in a planar stack) 9 that separates the individual cells in the stack. The gas flow separator plate separates fuel flowing to the fuel electrode (i.e. anode 3) of one cell in the stack from oxidant, such as air, flowing to the air electrode (i.e. cathode 7) of an adjacent cell in the stack. The fuel may be a hydrocarbon fuel, such as natural gas for internally reforming cells, or a reformed hydrocarbon fuel comprising hydrogen, water vapor, carbon monoxide and unreformed hydrocarbon fuel for externally reforming cells. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material, such as a Cr—Fe alloy. An electrically conductive contact layer, such as a nickel contact layer, may be provided between the anode electrode and the interconnect. FIG. 2 shows that the lower SOFC 1 is located between two gas separator plates 9.

Furthermore, while FIG. 2 shows that the stack comprises a plurality of planar or plate shaped fuel cells, the fuel cells may have other configurations, such as tubular. Still further, while vertically oriented stacks are shown in FIG. 2, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

A method of forming a planar, electrolyte supported SOFC 1 shown in FIG. 1 includes forming the planar solid oxide electrolyte 5 followed by forming the cathode electrode 7 on a first side of a planar solid oxide electrolyte 5 and forming the anode electrode 3 on a second side of electrolyte 5. The anode and the cathode may be formed in any order on the opposite sides of the electrolyte.

For example, the electrolyte may be formed by mixing the YSZ powder with SSZ or SCSZ powder followed by shaping (such as tape casting, roll pressing or other suitable ceramic shaping techniques) and sintering the powders at any suitable temperature to form the electrolyte. The anode electrode containing a plurality of sublayers shown in FIG. 1 may be formed by a screen printing method or by other suitable methods. The first anode 3 sublayer can be screen printed on the electrolyte 5, followed by screen printing the second anode sublayer on the first sublayer using any suitable ceramic powder screen printing techniques. The screen printed cell is then sintered or fired at any suitable temperature, such as a temperature between 1150 and 1400° C. in air. The cell may be separately fired or sintered after the anode deposition and after the cathode deposition at the same or different temperature. The completed cell is preferably further annealed in a reducing atmosphere, such as a hydrogen or forming gas atmosphere, to covert nickel oxide to nickel in the anode prior to using fuel cell to generate electricity as part of a fuel cell system.

A performance of various electrolytes were tested. Specifically, the performance of the YSZ and SCSZ composite electrolyte of the embodiments of the invention having the following composition (25% by weight of 3 molar percent yttria YSZ and 75% by weight of $[(ZrO_2)_{1-y}(CeO_2)_y]_{1-x}(Sc_2O_3)_x$ where x=0.1 and y=0.01) ("YSZ+SCSZ") was compared to the following comparative example electrolyte compositions: (a) 3 molar percent yttria YSZ ("3YSZ"); (b) 8 molar percent yttria YSZ ("8YSZ"); and (c) $Sc_xCe_yZr_{1-x-y}O_2$ where x=0.1 and y=0.01 ("SCSZ").

Figure 3:
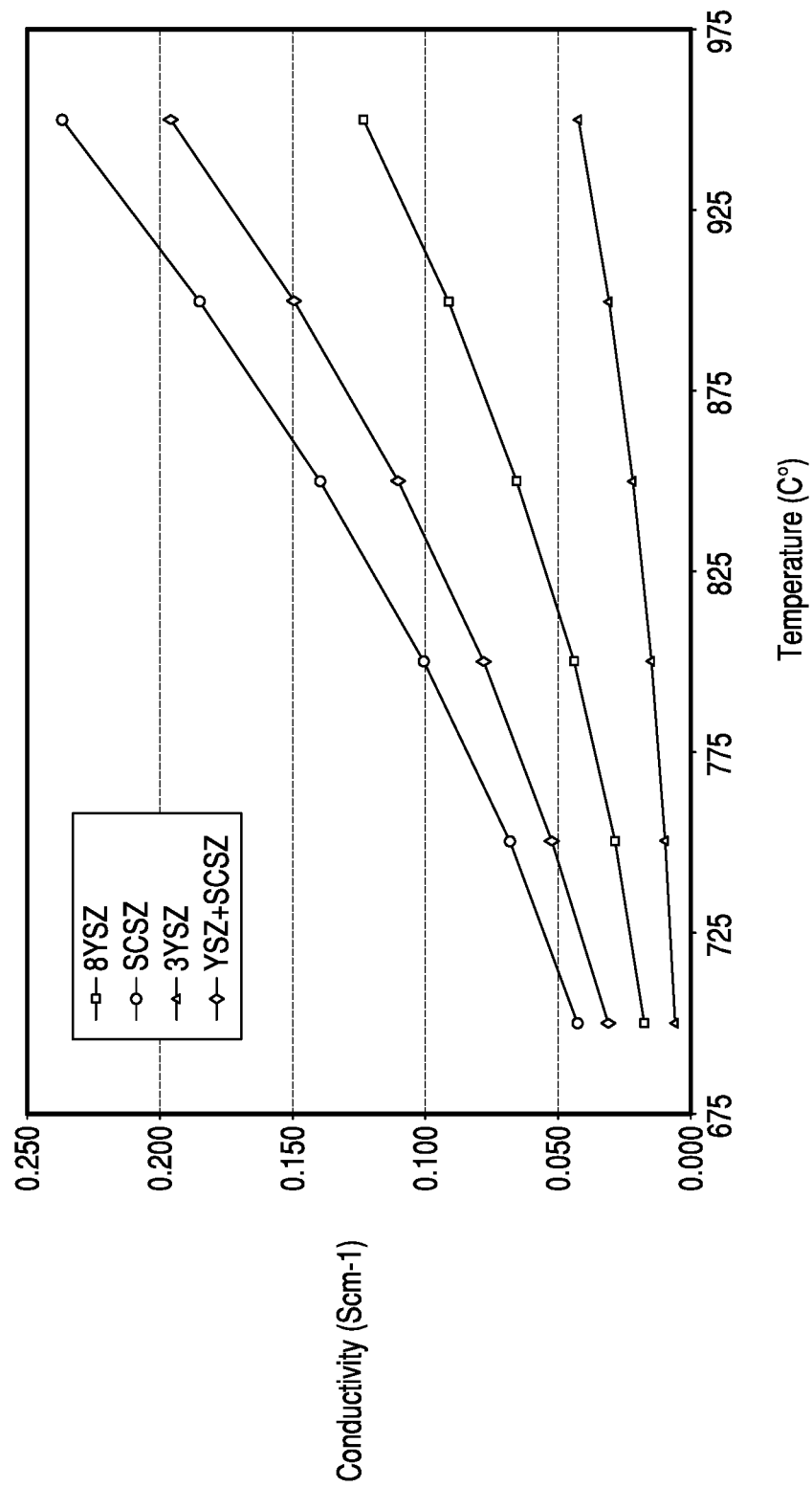
FIG. 3 illustrates a plot of conductivity versus temperature for the electrolyte of the embodiment of the invention and for electrolytes of the comparative examples.

FIG. 3 illustrates a plot of conductivity versus temperature for the four electrolytes. The conductivity of the YSZ+SCSZ electrolyte is higher than that of the 8YSZ and 3YSZ electrolytes, but slightly lower than that of the SCSZ electrolyte.

Figure 4:
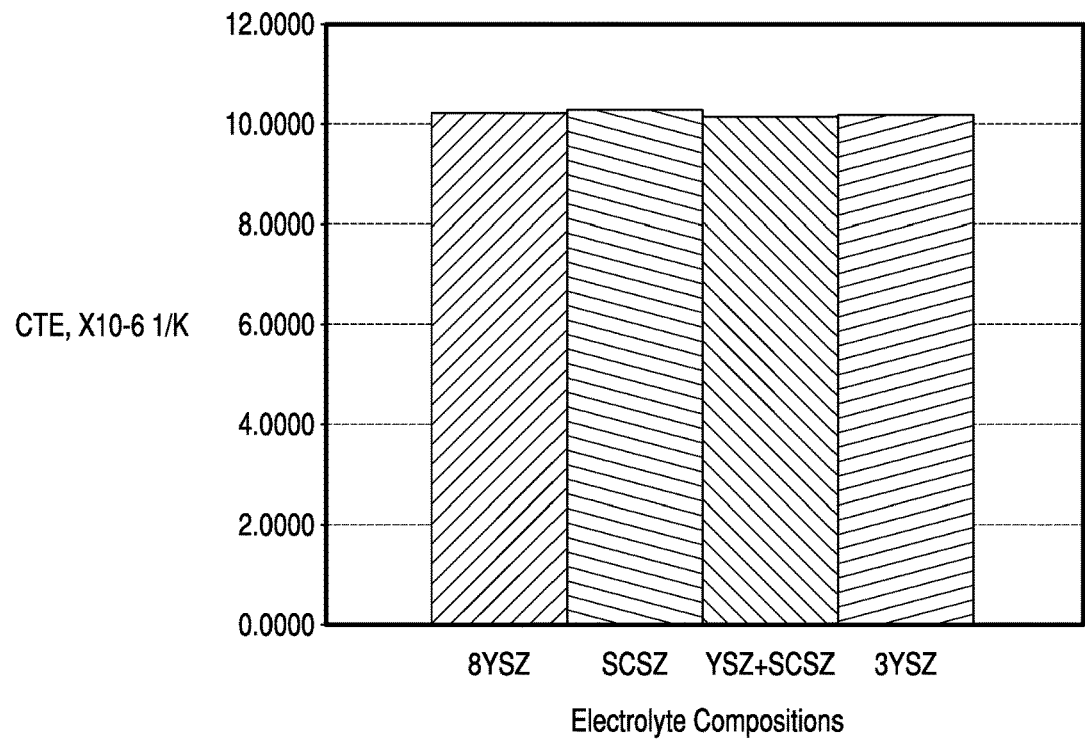
FIG. 4 illustrates a bar graph comparing the CTE of the electrolyte of the embodiment of the invention and of electrolytes of the comparative examples

FIG. 4 illustrates a bar graph comparing the CTE of the four electrolytes. The CTE of the YSZ+SCSZ electrolyte is about the same as that of the electrolytes of the comparative examples.

Figure 5:
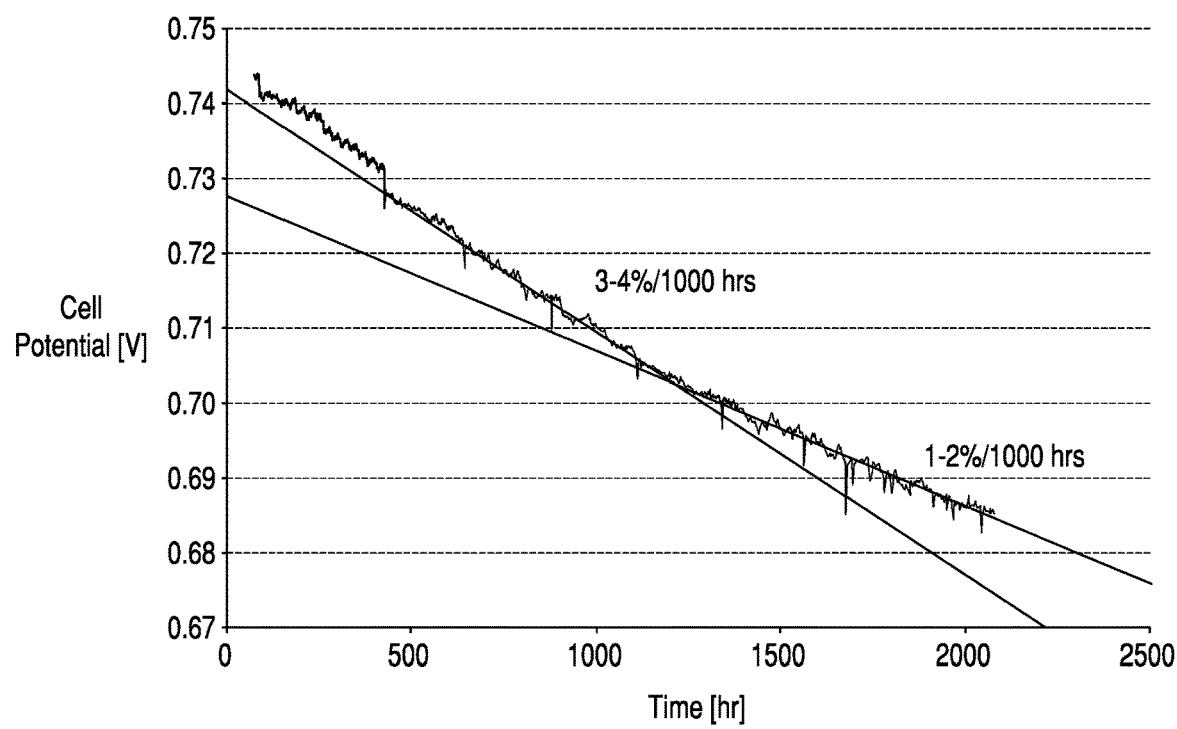
FIG. 5 illustrates a plot of cell voltage versus time for a SOFC cell containing the electrolyte of the embodiment of the invention.

FIG. 5 illustrates a plot of cell voltage versus time for a SOFC cell containing the YSZ+SCSZ electrolyte. This endurance test indicates that the cell voltage degrades about 3-4% for the first 1000 hours and about 1-2% for the second thousand hours of operation.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of making a solid oxide fuel cell, comprising:
   mixing yttria stabilized zirconia powder with scandia ceria stabilized zirconia powder to form a powder mixture, wherein:
   the scandia ceria stabilized zirconia comprises 1 molar percent or less ceria, about 6 to about 11 molar percent scandia and a balance comprising zirconia;
   shaping the powder mixture;
   sintering the shaped powder mixture to form an electrolyte;
   forming an anode electrode on a first side of the electrolyte, wherein the electrolyte is thicker than the anode electrode, wherein:
   the anode electrode comprises a first sublayer comprising nickel and samaria doped ceria and a second sublayer comprising a doped ceria containing ceramic phase and a nickel containing phase, wherein the samaria doped ceria comprises about 15 to about 25 molar percent samaria; and
   the first sublayer is located between the electrolyte and the second sublayer; and
   forming a cathode electrode on a second side of the electrolyte.

2. The method of claim 1, wherein the scandia ceria stabilized zirconia comprises 1 molar percent ceria, 10 molar percent scandia and the balance comprising zirconia.

3. A method of making a solid oxide fuel cell, comprising:
   mixing powders to form a powder mixture comprising zirconia, 1 molar percent or less ceria, about 6 to about 11 molar percent scandia;
   shaping the powder mixture;
   sintering the shaped powder mixture to form an electrolyte;
   forming an anode electrode on a first side of the electrolyte, wherein the electrolyte is thicker than the anode electrode, wherein:
   the anode electrode comprises a first sublayer comprising nickel and samaria doped ceria and a second sublayer comprising a doped ceria containing ceramic phase and a nickel containing phase, wherein the samaria doped ceria comprises about 15 to about 25 molar percent samaria; and
   the first sublayer is located between the electrolyte and the second sublayer; and
   forming a cathode electrode on a second side of the electrolyte.

4. The method of claim 3, wherein the powder mixture comprises 1 molar percent ceria and 10 molar percent scandia.

5. The method of claim 3, wherein:
   an amount of nickel in the first sublayer is less than the amount of nickel in the second sublayer.

6. The method of claim 1, wherein the anode has a thickness between 20 and 40 microns and the electrolyte has a thickness between 150 and 300 microns.

7. The method of claim 6, wherein the first sublayer has a thickness less than 10 microns.

* * * * *